Figure 2:
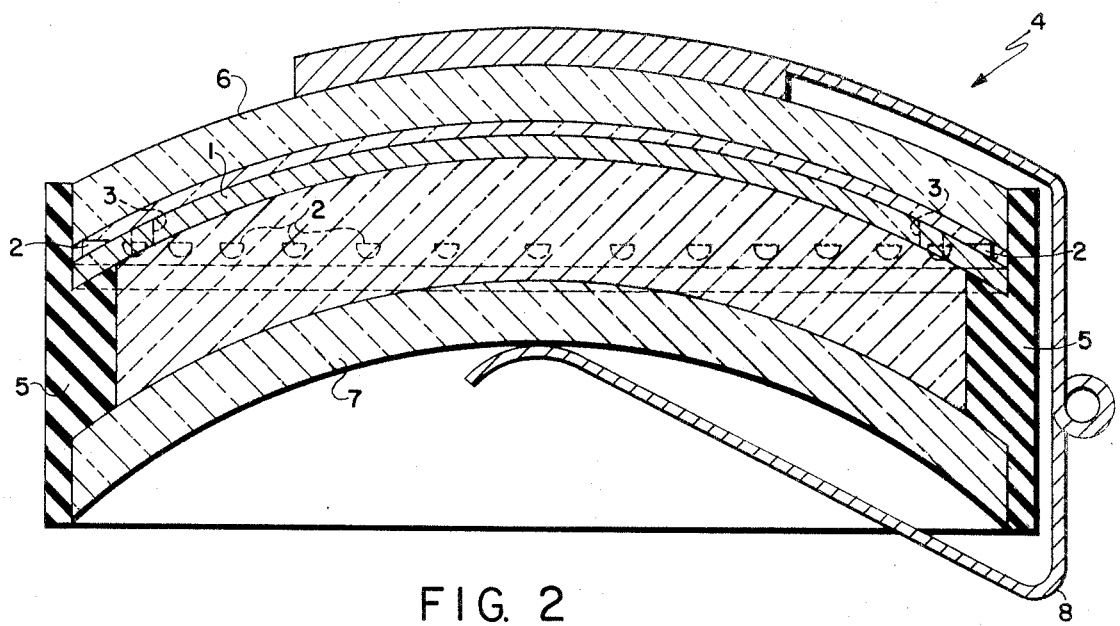

United States Patent [19]
Cohen

[11] 3,846,013
[45] Nov. 5, 1974

[54] LIGHT-POLARIZING ELEMENT

[75] Inventor: Fredric S. Cohen, Lexington, Mass.

[73] Assignee: Polaroid Corporation, Cambridge, Mass.

[22] Filed: Dec. 7, 1972

[21] Appl. No.: 312,909

Related U.S. Application Data

[63] Continuation-in-part of Ser. No. 249,550, May 2, 1972, abandoned.

[52] U.S. Cl..................... 350/147, 351/49, 351/177
[51] Int. Cl. ............................................ G02b 5/30
[58] Field of Search ........... 51/277; 156/295; 264/1, 264/328; 350/154, 147, 155, 159, 178; 351/49, 159, 177; 161/42, 109, 110, 7

[56] References Cited
UNITED STATES PATENTS

| | | | |
|---|---|---|---|
| 3,077,005 | 2/1963 | Sokol | 264/1 |
| 3,355,342 | 11/1967 | Lanman | 351/177 |
| 3,594,457 | 7/1971 | Wright | 264/1 |
| 3,674,587 | 7/1972 | Laliberte | 264/328 |

Primary Examiner—Ronald L. Wibert
Assistant Examiner—Michael J. Tokar
Attorney, Agent, or Firm—Sheldon W. Rothstein

[57] ABSTRACT

A light-polarizing lens element and method suitable for forming a composite lens comprising in situ polymerized components on each side of said lens element, said element comprising means for maintaining a predetermined distance between at least one of its faces and a rigid mold component adjacent that face.

8 Claims, 2 Drawing Figures

PATENTED NOV 5 1974

3,846,013

LIGHT-POLARIZING ELEMENT

This application is a continuation-in-part of U.S. patent application Ser. No. 249,550, filed May 2, 1972, in the name of Fredric S. Cohen, now abandoned.

The present invention is directed toward a light-polarizing element adapted to be employed in the manufacture of plastic, composite, ethical light-polarizing lenses and to methods of producing such lenses. Plastic, light-polarizing ethical lenses are particularly adapted to be utilized in providing substantially any given ophthalmic lense prescription to accommodate the eyes of a prospective user and facilitate a correction to such user's vision, while at the same time providing to such user the benefits which may only be achieved by employing a light-polarizing material.

It will be apparent that many advantages may be achieved by utilizing a tough, optical quality plastic material for ophthalmic lenses in lieu of glass. Plastics are more highly resistant to fracture than glass, do not require extremely high temperatures to produce a desired lens, and do not generally require the expensive grinding and polishing operations which must be carried out, in most cases, before a glass lens is completed. Before the development of modern transparent optical quality synthetic plastic materials, it was highly undesirable to form lenses from synthetic plastics since most of the available plastics were soft and therefore susceptible to severe abrasion. In addition, in those instances where tough, thermosetting resins were utilized for lens manufacture, such resins were difficult to handle in the thicknesses required for ophthalmic lenses. Until recently, people requiring corrective lenses to restore and/or aid their vision were denied the benefits of light-polarizing lenses which were made entirely of synthetic plastic materials. The few light-polarizing ethical lenses available comprised glass elements between which a light-polarizing member was interposed. However, this obviously did not eliminate any of the problems inherent in glass lenses and, due to the difficulties encountered in the manufacture of such lenses and the extremely high incidence of rejects, such lenses were inordinately expensive.

The method of manufacturing synthetic plastic ophthalmic lenses generally comprises the injection of a synthetic plastic monomeric material immediately adjacent each side of a light-polarizing element secured into a mold. The respective curvatures of the surfaces of the ultimately produced lens are, of course, governed by the shapes of the surfaces of the mold elements adjacent each respective surface of the light-polarizing element and offset therefrom a predetermined distance. Since, as will be appreciated from the discussion hereinbelow, plastic ophthalmic lenses are usually ground to a given prescription by grinding only the rear or concave surface of the lens, the light-polarizing element should be offset toward the convex side of the lens as much as possible thereby providing a substantially thicker concave in situ polymerized component than the convex in situ polymerized component. This has generally been facilitated by inserting a light-polarizing element into a mold and, immediately about the periphery of the light-polarizing element and directly thereupon, placing a small, fragile unit of gasket material upon which the upper mold element is destined to come in contact. The utilization of such gasket materials, it will be appreciated, is a substantial impediment to uniformly providing high quality ophthalmic component structures at a reasonable cost. One of the great difficulties with the process, as a matter of fact, has been the handling of the gasket materials.

By the present invention, it is now possible to produce composite synthetic plastic light-polarizing ethical lenses without employing a gasket material since the light-polarizing element which is to be secured into a suitable mold prior to the in situ polymerization operation has been provided with projections about its periphery to provide a predetermined distance between at least one face of the light-polarizing element and its complementary mold component.

It is accordingly an object of the present invention to provide light-polarizing ophthalmic lenses which comprise synthetic plastic materials.

It is another object of the present invention to provide a light-polarizing subcombination of the in situ polymerized composite ophthalmic lens described hereinabove, which subcombination comprises a light-polarizing element having means about the periphery of at least one surface thereof which insures the maintenance of a predetermined distance between that surface and an adjacent mold element.

It is a further object of the present invention to provide a process for the preparation of light-polarizing ophthalmic lenses which is economical and has a low incidence of rejects.

The invention accordingly comprises the process involving the several steps and the relation of one or more of such steps with respect to each of the others and the product possessing the features, properties and relation of elements which are exemplified in the following detailed disclosure and the scope of the application which will be indicated in the claims.

Figure 1:
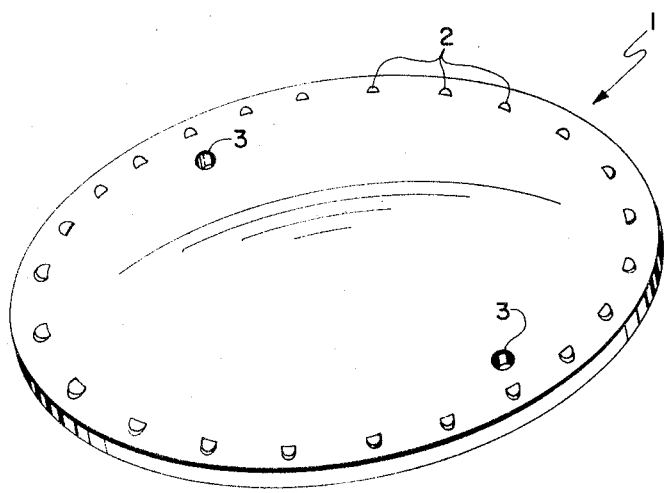

For a fuller understanding of the nature and objects of the invention, reference should be had to the following detailed description, taken in connection with the accompanying drawings wherein:

FIG. 1 is a perspective view of the light-polarizing element of the present invention having offset means about the periphery thereof which insures the maintenance of a predetermined distance between the face of the light-polarizing elements and a mold component adjacent thereto; and FIG. 2 is a side cross-sectional view of the lens being formed in a suitable mold according to the present invention.

Stated generally, the present invention contemplates the casting of plastic lenses in mold cavities formed, preferably, between rigid and flexible mold components, said flexible mold components being preferably cylindrical. More specifically, the invention contemplates the employment of a shaped light-polarizing synthetic plastic member between layers of an optical quality synthetic monomeric material in a mold comprising rigid and resilient components; and heating the material and mold thereby causing in situ polymerization of said monomeric material with the concomitant formation of a composite synthetic plastic light-polarizing lens structure, it being a principal feature of the invention that the light-polarizing element have integral means for assuring that a predetermined distance be maintained between at least one of its faces and the mold element adjacent thereto.

The principal lens produced by the present invention is prepared according to the procedure generally described above, which will be more fully discussed below, and is supplied to optical laboratories, usually in a semi-finished form, for distribution. Due to limitations in modern grinding and polishing equipment for plastics, the front, or convex surface of the lens is preferably cast into its finished configuration at the time of manufacture, its surface requiring no grinding or polishing. The concave surface, however, is preferably formed in a variety of diopters which encompass a range of plus and minus corrections. Any given particular prescription may be prepared by selecting a lens with cast-in optics close to the prescribed dimensions, followed by grinding and polishing the concave surface according to the exact prescription required. It will be evident that in certain instances the configuration of the lens will conform to the desired prescription without further grinding or polishing.

As is well known in the lens casting art, as polymerization occurs, the lens material shrinks a certain degree, thereby, in many instances, causing the lens surfaces to conform to a shape different from that of the mold surfaces. There are numerous well-known techniques available to the operator to provide a hedge against this phenomenon. The preferred technique is to construct the body of the mold of a resilient material, and preferably a vinyl material which will shrink in conjunction with the shrinkage inherent in the polymerization process, thus assuring substantial conformity of the ultimate configuration produced on each of the lens surfaces with the surface of the rigid mold element with which it is intimate.

Any suitable polymeric light-polarizing sheet material which will produce the desired light-polarization effect may be utilized in the context of the present invention. However, the preferred material is a transparent sheet of polyvinyl alcohol containing substantially oriented molecules of dehydrated polyvinyl alcohol and deriving its light-polarizing properties essentially from the dehydrated molecules. The manufacture and utilization of such sheet material may be appreciated with reference to U.S. Pat. Nos. 2,173,304; 2,255,940; 2,306,108; 2,445,555; 2,453,186; and 2,674,159 all incorporated herein by reference. Among other materials which may be utilized as light-polarizing elements in the present invention are, for example, polyvinyl butyral and polyvinyl alcohol, used in conjunction with a dichroic stain.

In a preferred embodiment of the present invention, the light-polarizing material is sandwiched between relatively thin layers of an optical quality transparent polymeric material which serves to support said light-polarizing material. Among the materials which may be utilized for this purpose are cellulose acetate butyrate, methyl methacrylate, cellulose acetate, cellulose triacetate, etc. Cellulose acetate butyrate is preferred. The bond between the light-polarizing element and the polymeric support material may be accomplished, for example, according to the methods of Buzzell and Bloom, U.S. Pat. Nos. 3,620,888 and 3,588,216, respectively, both incorporated herein by reference. It will be appreciated from a reading of the above patents that lamination of a cellulose acetate butyrate support material to a typical polarizing sheet as, for example, one comprising polyvinyl alcohol, may be accomplished either by subcoating the cellulose acetate butyrate material with a suitable compound such as, for example, cellulose nitrate, and then laminating the subcoated material to the polyvinyl alcohol light-polarizing sheet using a well-known pressure roll technique with a typical adhesive for such materials such as, for example, a two percent polyvinyl alcohol solution, or alternatively, the lamination may be accomplished by the conversion of the surface of the cellulose acetate butyrate to cellulose, subcoating the surface with polyvinyl alcohol, and pressure laminating the subcoated cellulose acetate butyrate to the light-polarizing material, as more fully disclosed in the Buzzell patent mentioned above.

The light-polarizing element utilized in the present invention is preferably preformed to adequately conform to the respective configurations of the plastic elements which are to be polymerized on either side thereof. Accordingly, it will be apparent that the more extreme configurations in the convex and concave elements will require concomitant deviations in the shape of the light-polarizing element from the planar configuration. In addition, in order to avoid light refraction problems the curvature of the light-polarizing element should be approximately the same as the curvature of the convex surface of the lens. In order to prevent injuring the light-polarizing element during grinding and polishing of the concave surface, the light-polarizing element should be situated reasonably close to the concave surface of the lens. Preforming of the light-polarizing element is preferably accomplished by a conventional pressing operation.

During the preforming of the light-polarizing insert, it will be appreciated that various diopters of curvature may be employed and, as denoted, such curvatures will generally conform to the desired curvature that the outer or generally convex surface of the ultimate lens will follow. In order to eliminate the requirement that a gasket material be utilized in forming the lens of the present invention, offset areas about the periphery of the insert which serve the purpose of maintaining the insert a predetermined distance from a mold element may be established about the periphery of the insert during the preform pressing operation. This is simply facilitated by employing punch areas which are capable of providing projections above a surface of the preformed light-polarizing element which insures the mold component of said functionality.

In accordance with the present invention, the light-polarizing lens element insert will generally comprise a concave and a convex face and means raised from either of said faces, but preferably from said convex face, peripherally outside the anticipated viewing area of the ultimately formed lens comprising said element, the raised means being capable of maintaining a predetermined distance between the face of the light-polarizing element having the raised means projecting therefrom and the mold element utilized to provide the curvature to the in situ polymerized synthetic plastic lens component which generally follows the contour of the face comprising the raised means. It will be appreciated that, in providing the functionality of the present invention, the raised means may comprise a multiplicity of projections or a uniform rim offset from, preferably, the convex face.

In the most preferred embodiment, it is desirable to employ a tie coat between the light-polarizing element and the outer polymeric elements. Any material which will increase the adhesion of the light-polarizer to the resinous material without deleteriously effecting the final structure is suitable for use. It has been found that cellulose nitrate produces excellent results when used in this environment. Its employment, however, is preferred in conjunction with, for example, a melamine-formaldehyde condensation polymer as claimed in co-pending application of Norman W. Schuler, Ser. No. 249,651, filed May 2, 1972.

In actual operation, a suitable catalyst is dissolved in the monomeric material from which the outer layers of the desired lens are to be manufactured. The mold, as depicted in FIG. 2, is preferably constructed with outer rigid mold elements, preferably comprising glass, the front element being seated against raised means depending from a light-polarizing member which is secured in place by a resilient mold element constructed, for example, of rubber. The resilient body element is preferably cylindrical; however, within the context of the present invention it may assume any desired transverse cross-sectional configuration, as, for example, rectangular, square, elliptical, etc. Using a suitable syringe, monomer with catalyst incorporated therein is injected through the resilient area into the mold on one or both sides of the light-polarizing element, and the entire structure is then heated for a sufficient time to cause the material to polymerize. Any optical quality synthetic plastic material may be utilized for the outer members of the lenses of the instant invention provided, however, that its ultimate second order transition temperature is above the highest temperature at which the lenses may be utilized; as, for example, in the average usage of ophthalmic lenses, 130° F. Exemplary monomeric materials are 1,3-butylene glycol dimethacrylate, acrylonitrile, allyl methacrylate, trimethylol propane triacrylate, cyanoethyl methacrylate, bis phenyl A dimeth-acrylate, methoxybutyl methacrylate, methyl methacrylate, diethylene glycol bis allyl carbonate, ethoxymethyl meth-acrylate, ethylene glycol dimethacrylate, ethylene glycol diacrylate, polyethylene glycol dimethacrylate, etc.

Monomeric materials, such as those enumerated in the paragraph next above, may be formed into homopolymers or, alternatively, copolymerized with materials which increase their hardness, heat resistance, etc. Among such materials which may be copolymerized with the above-mentioned exemplary monomers are vinyl acetate, maleic anhydride, ethylene glycol maleate, triallyl cyanurate, diallyl phthalate, etc.

Another principal feature of the present invention involves the manufacture of composite, light-polarizing plastic lenses as described above by injecting a synthetic plastic monomer material on only one side of a light-polarizing element secured in a mold. Since the light-polarizing element will generally be situated as close as reasonably possible to a rigid mold component, techniques involving the injection of monomer between such mold component and the light-polarizing element should be avoided. This may be accomplished by providing the light-polarizing element, adjacent its periphery, with one or more ports capable of acting as a conduit(s) for monomeric material from the cavity into which it has been injected to the opposed cavity. Air evacuation of such opposed cavity may be accomplished by appropriately providing a hole in the resilient component; providing a hole in the periphery of the adjacent rigid component; slightly offsetting the adjacent rigid component from the resilient component during filling; appropriately arranging at least one air-escape port in the light-polarizing element whereby displaced air may be transmitted from one cavity to the other; etc. The lattermost method is preferred. In facilitating such, the light-polarizing element is provided with at least two holes about its periphery, preferably one hundred and eighty degrees opposed, and seated in the mold. With the mold positioned so that the peripheral holes define an approximately vertical line, the rigid component defining the larger cavity is slightly separated from the resilient component and monomeric material is injected and substantially fills such cavity. The mold is put aside for a short time with the peripheral holes maintaining their vertical alignment whereupon the monomer levels in both cavities equalize. After level equalization, more monomer is injected into the larger cavity and the levels permitted to again equalize. This is continued until the mold is filled. Since, as has been aforenoted, the concave area of the lens will comprise a substantially thicker polymerized section, the polymer will preferably be injected into that cavity and will flow therefrom into the convex area. Accurate amounts of material for injection may be determined by simple volumetric computations.

Since thermosetting materials are, as a rule, far more abrasion resistant than thermoplastic materials, they are preferred for use in the present invention. It has been found that when diethylene glycol bis allyl carbonate, the preferred material, is utilized, a cure time of about eight to sixteen hours is required before the lens is completely formed.

Any catalyst compatible with the chosen monomeric material utilized in the present invention may be employed. Examples of suitable catalysts are diisopropyl percarbonate, benzoyl peroxide, azobisisobutyronitrile, methylethyl ketone peroxide, di-s-butyl percarbonate, etc. In the preferred systems of the present invention, di-s-butyl percarbonate has been found to give extremely fine results when utilized in proportions of approximately 2.5 to 4.5 percent based upon the weight of the monomer.

In order to provide a desired color to the lenses of the present invention, various dyes may be incorporated therein either by being absorbed on the surface of the outer polymeric material by being integral with the initial monomeric charge, or by being imbibed or cast into the plastic support members for the light-polarizing material. In addition, other agents such as ultraviolet radiation absorbers, infrared radiation absorbers, visible light attenuation dyes, etc., may be added to the system to provide additional benefits.

Referring to FIG. 1 of the drawings, there is illustrated a perspective view of a typical light-polarizing lens element 1 according to the present invention. Projections 2 depending from the light-polarizing element will generally be offset from the convex surface of the lens by 8 to 15 mils, approximately, and as aforenoted will provide the requisite positional relationship between the convex surface of the lens and a rigid mold element used in conjunction therewith. Also denoted about the periphery of element 1 are port holes 3 which, in the preferred embodiment, are employed to facilitate the transfer of injected monomeric material from the concave to the convex cavity of an assembled mold comprising the light-polarizing lens element.

Referring now to FIG. 2, element 1, having projections 2 and monomer transfer ports 3, is depicted secured in mold 4 which is composed of resilient body element 5 and rigid elements 6 and 7. Rigid element 6, which will provide the convex surface to the ultimately produced lens, is in direct contact with projections 2 and the thickness of the ultimately produced in situ polymerized lens component is determined by the offset distance between rigid mold element 6 and the convex face of element 1. The resinous material inserted between the light-polarizing element 1 and elements 6 and 7, respectively, may be inserted into the mold in any known manner, but preferably by injection into the concave cavity through the resilient mold member with consequent transfer of monomeric material to the convex cavity as hereinbefore described. The assembled mold is securely held together by clamp element 8; however, it should be understood that any suitable means of holding the mold together such as, for example, integral resilient element lip members, etc., may be utilized. While the resilient portion of the mold may generally comprise any elastomeric material, it is preferred to utilize a resilient mold member comprising polyvinyl chloride plasticized with dioctyl phthalate in conventional manner.

The plastic lenses of the present invention may be produced in a blank, or unfinished form, and may subsequently be ground and polished, if necessary, using the same technology and major equipment utilized on crown glass. However, as has been alluded to above, in the event that grinding and polishing is performed, the operations will preferably be carried out on the concave surface of the lens, since, in the preferred embodiments, nearly the full range of possible prescriptions will have been cast into the convex surfaces of lenses from which the operator may choose. It is estimated that in order to fully accomplish this goal, between four and five hundred different convex configurations will be utilized in producing a full range of lenses for ophthalmic use. While the primary purpose of the present invention is to provide ethical ophthalmic lenses, it will, of course, be appreciated that lenses cast in a planar configuration for use without alteration is anticipated herein.

The following example illustrates the preparation of a typical lens of the instant invention and is to be considered illustrative only and not taken in a limiting sense.

EXAMPLE

A sheet of a light-polarizing material comprising partially hydrolyzed polyvinyl alcohol, each face of which has bonded thereto a layer of cellulose acetate butyrate approximately 5 mils. in thickness — said cellulose acetate butyrate layers having integral therewith a light-attenuating dye material — is roll-coated on both surfaces thereof with a thin layer of cellulose nitrate; pressed to a spherical configuration of approximately six diopters between heated platens; and cut into a circular configuration while simultaneously having projections raised about the periphery thereof and two small holes placed opposed to one another generally along the periphery of the element. The hole-providing functionality and projection raising is generally facilitated by means of a conventionally formed dye member which provides such facility commensurate with the cutting operation. The formed light-polarizing element is then placed onto a flange portion of the cylindrical resilient mold element and an upper glass mold element is placed in contact with the raised projections on the convex surface of the light-polarizing element, the surface configuration of the glass mold element substantially opposed to the surface of the light-polarizing element conforming to the surface configuration of the light-polarizing element. A second glass mold element is placed in abutting relationship to said resilient mold element on the side of said light-polarizing element opposed to the first rigid mold element and the entire unit is clamped together in conventional fashion. About three and one half percent, by weight, of di-s-butyl percarbonate catalyst is added to a predetermined quantity of diethylene glycol bis allyl carbonate monomer purchased from Pittsburgh Plate Glass Company under the trade designation CR-39 and injected into the concave cavity utilizing a suitable syringe in stepwise fashion until the entire mold is full. The unit is then placed in an oven for fifteen hours where the temperature is raised from 90° F. to approximately 160° F. in conventional manner. After approximately a fifteen-hour cure time, the mold is disassembled, and the composite lens is removed and preferably placed in an annealing oven at 200° F. for about two hours to relieve any stresses which may have been built up during the forming cycle.

The instant invention contemplates, at the option of the operator, the utilization of conventional additives which may accelerate, inhibit or otherwise alter the polymerization characteristics of the chosen polymer in order to achieve the desired cure cycle for the lens disclosed herein.

Throughout the specification, the term "ethical" has been used to describe certain ophthalmic lenses. In the context of the present invention, "ethical" denotes lenses of the nonplanar variety, which are produced according to a given prescription.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A light-polarizing lens element having a first surface, a second surface, and projections from at least one of said surfaces outside the anticipated viewing area of the ultimate composite lens comprising said element, said projection being integral with and formed by deformation of said surface and being capable of maintaining a predetermined distance between the surface of said element from which said projections are raised and a mold element in contact with said raised projections.

2. The invention of claim 1 wherein said projections extend between eight and fifteen mils above the surface of the element.

3. The invention of claim 2 wherein said projections are disposed about the periphery of the element in a sufficiently large number to maintain said predetermined distance between said surface and said mold element.

4. The invention of claim 1 wherein said first surface is convex and said second surface is concave.

5. The invention of claim 4 wherein said element comprises at least one peripheral port capable of facilitating the transport of liquid material from one side of said element to its opposed side.

6. The invention of claim 5 wherein said element comprises two peripheral ports approximately one hundred and eighty degrees opposed.

7. The invention of claim 4 wherein said projections are raised from said convex surface.

8. The invention of claim 1 wherein said light-polarizing lens element comprises a transparent sheet of polyvinyl alcohol containing substantially oriented molecules of dehydrated polyvinyl alcohol supported between uniform layers of cellulose acetate butyrate.

* * * * *